(No Model.) 2 Sheets—Sheet 1.
E. W. JENKINS.
THRASHING MACHINE.
No. 487,274. Patented Dec. 6, 1892.
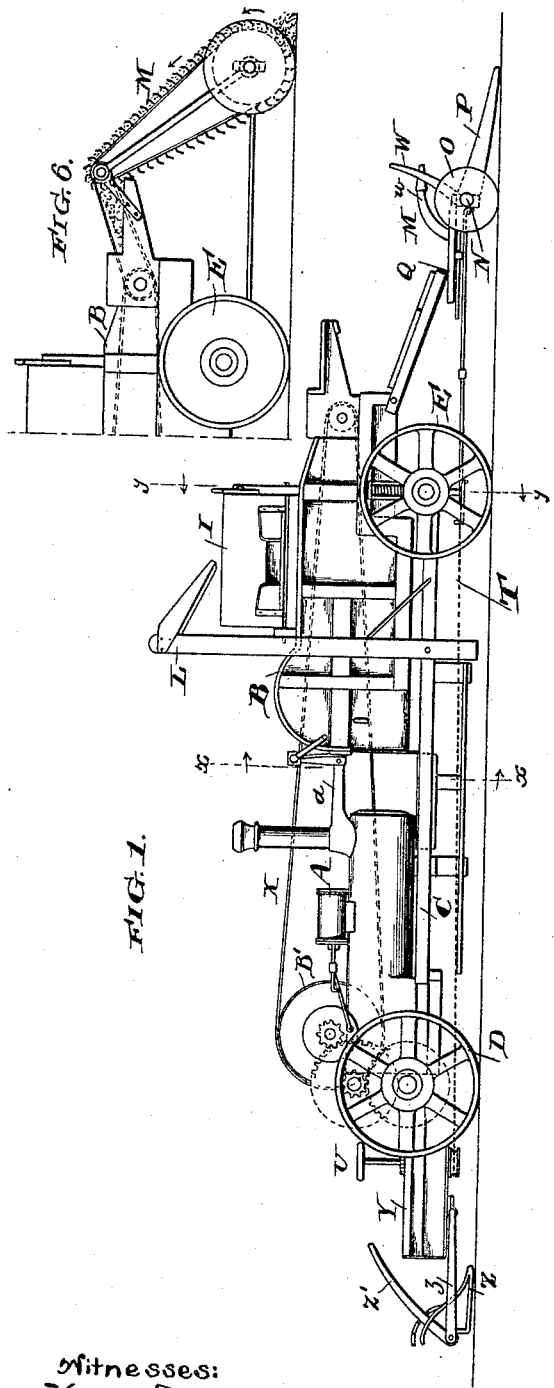
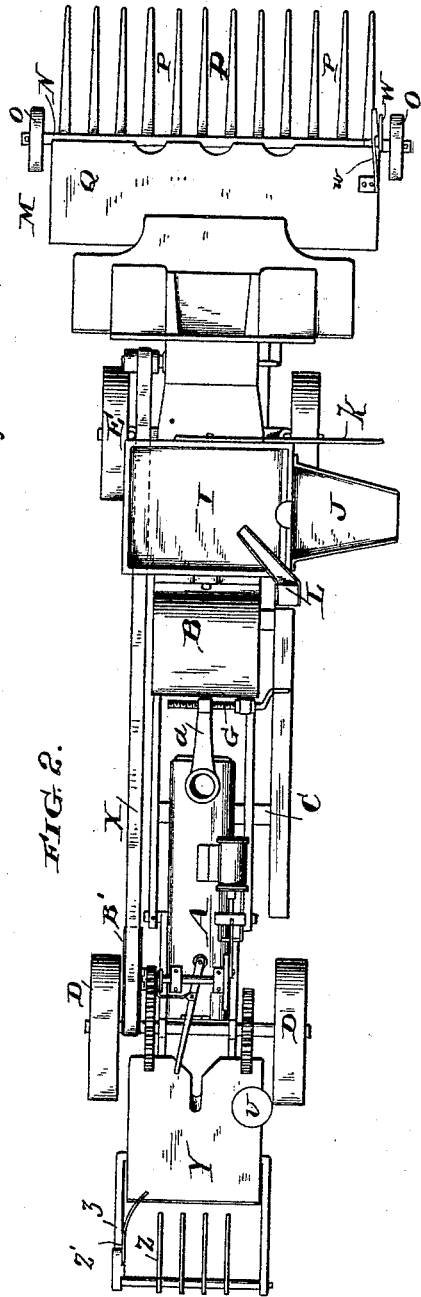
Witnesses:
Inventor:
Edward W. Jenkins (No Model.) 2 Sheets—Sheet 2.
E. W. JENKINS.
THRASHING MACHINE.
No. 487,274. Patented Dec. 6, 1892.
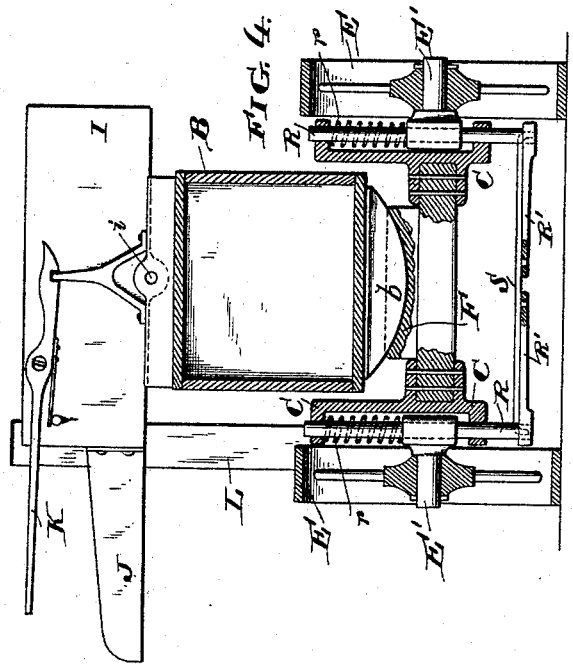
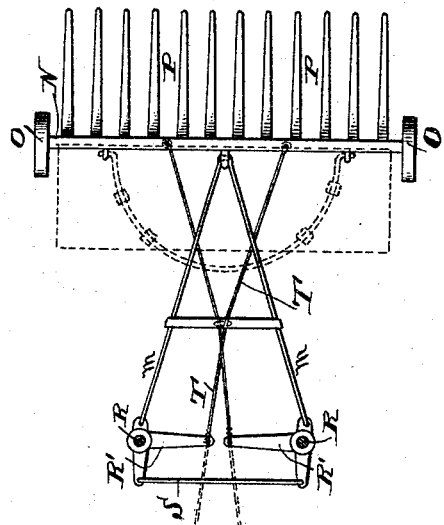
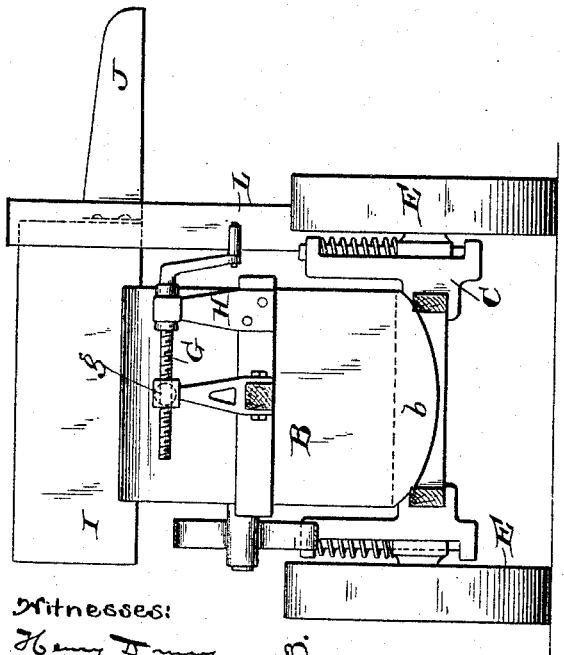
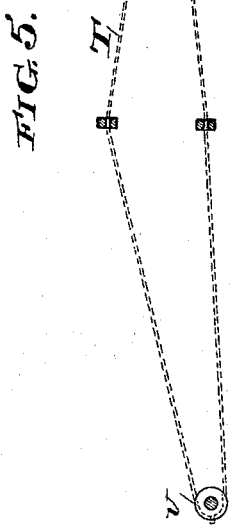
Witnesses:
Inventor:
Edward W. Jenkins
By his atty

UNITED STATES PATENT OFFICE.

EDWARD W. JENKINS, OF DURBIN, NORTH DAKOTA.

THRASHING-MACHINE.

SPECIFICATION forming part of Letters Patent No. 487,274, dated December 6, 1892.

Application filed September 7, 1891. Serial No. 404,973. (No model.)

*To all whom it may concern:*

Be it known that I, EDWARD W. JENKINS, of Durbin, in the county of Cass and State of North Dakota, have invented an Improvement in Thrashing-Machines, of which the following is a specification.

My invention relates to thrashing-machines; and it consists of certain improvements, which are fully set forth in the following specification and are shown in the accompanying drawings, which form a part thereof.

More particularly my invention relates to a traveling thrashing-machine constructed and arranged to travel over a field, collect the cut grain from the ground, and thrash and separate it while in motion.

My invention also relates to the combination, with such a traveling thrashing-machine, of a gleaner or rake moving therewith and adapted to gather the grain from the field, so that it may be delivered to the thrashing-machine.

My invention also relates to the combination of the thrashing and separating machine with power devices whereby it may be moved over the field to gather the cut grain.

My invention also includes certain improvements in construction and in combinations of parts, which are hereinafter more fully described and claimed.

The object of these improvements is to facilitate and cheapen the operation of harvesting a field of grain by employing a traveling machine to thrash and separate the grain operated by comparatively-few men and caused to travel itself over the field after the cut grain, taking it from the ground as it lies either in the swath or in shocks, and thrashing and separating the grain as it travels about. By this means the cut grain of a field may be more quickly gathered and thrashed and the number of men, wagons, and horses required is greatly lessened.

In carrying out my invention I employ a thrasher and separator, which may be of any convenient construction. This thrasher and separator is mounted upon wheels and is connected with convenient power mechanism whereby it may be driven over the field to gather up the grain. This power mechanism for propelling the thrashing-machine may be a steam-engine on the thrasher or it may be a portable engine connected therewith. The construction which I prefer consists of an engine and thrashing and separating machine upon one frame with four wheels, two of which are under the engine and the other two under the thrashing-machine. I thus do away with the pair of front wheels of the engine and employ in lieu thereof the pair of wheels under the thrashing-machine, which should be of sufficient size to readily and easily turn the machine. The thrashing-machine is pivotally connected with an arm from the boiler of the engine and rests at its other end upon a curved bearing on the axle of the two front wheels. The thrashing-machine may thus be kept in a horizontal plane while the machine runs over irregular land or upon an inclined surface. By means of a leveling-screw between the boiler or main frame the thrashing and separating machine may be positively brought into a horizontal plane when the machine is being run over inclined land. The thrashing-machine is driven from the engine by means of a belt.

To take the grain from the ground, I employ a gleaner carried by the frame of the machine and adapted to be moved from side to side to take up the grain as the machine moves over the field. This may be either a rake adapted to take up the grain in the shocks and deliver it upon a platform, whence it may be lifted to the thrashing-machine, or it may be an elevator-gleaner adapted to take up the grain in the swath and deliver it directly to the machine. This gleaner is preferably pivoted, and by suitable connections it may be directed or turned from side to side to take up the grain.

When the portable engine is employed in the manner heretofore described, I prefer to arrange it so that it may be disconnected when desired.

The straw from the thrashing-machine may be allowed to fall upon the ground, and a portion may be used as fuel for the engine.

Referring now to the drawings, in which my improvements are more fully shown, Figure 1 is a side elevation of a harvesting-machine embodying my invention. Fig. 2 is a plan view of the same. Fig. 3 is a sectional view of the same, on an enlarged scale, on the line *x x* of Fig. 1, looking to the right. Fig. 4 is a transverse sectional view on the line y y of Fig. 1, also on an enlarged scale. Fig. 5 is a detail plan view of the gleaner-rake and its connections; and Fig. 6 is a side elevation of a portion of the harvesting-machine, illustrating the same when employing an elevator-gleaner for raising the grain in the swath.

A is the engine, which may be of any convenient construction.

B is the thrashing and separating machine.

C is the frame upon which the engine A and threshing-machine B are supported, having the rear wheels D located under the engine and the front wheels E under the thrashing-machine. The thrashing-machine B is preferably pivoted upon a horizontal axis to the arm $a$ of the boiler, so as to be free to swing thereon.

The lower forward part of the thrashing-machine B carries a guide $b$, which rests upon a curved bearing F, carried by the forward portion of the frame C. (See Fig. 4.)

G is a leveling-screw for leveling the thrashing-machine. It is journaled in a fixed arm H and held against longitudinal movement therein and works in the threaded sleeve $g$ upon the thrashing-machine. (See Fig. 3.) When the screw G is turned in either direction, it acts on the threaded sleeve $g$ and moves it in either direction, thus causing the thrashing-machine to rock upon its pivotal points.

I is a receiving-trough for the grain, located upon the top of the thrasher and pivotally connected therewith, as shown at $i$.

J is an outlet-mouth of the trough I.

K is a locking-lever for operating the receiving-trough.

L is an elevator for carrying the grain from the separator to the trough I. By operating the lever K the trough I may be allowed to swing upon its pivots to assume a position out of the horizontal and allow the grain to pass therefrom into a wagon or other convenient receptacle.

M is a gleaner carried by the front of the machine and free to swing from side to side. This gleaner, as shown in Figs. 1, 2, and 5, consists of a head N, provided with wheels O O, rake P, and platform Q.

R R are vertical rods mounted in bearings in the frame C, carrying axle-studs E'. The front wheels E E are journaled upon these axle-studs E' E'. I prefer to employ springs $r$ between the axle-studs E' and the frame C, so that the machine may travel easily over uneven ground. Carried by the rods R R are bell-cranks R' R', which are connected with the head of the gleaner M by a connection $m$.

S is a link connecting one pair of members of the bell-cranks R', whereby they are made to move together. The other members of the bell-crank are connected through a steering chain or connection T with the gleaner-head N. This steering connection is operated from a steering-wheel U.

Since the axle-studs E' E' are carried by the rods R R, it will be seen that any movement of the steering connection to move the gleaner from side to side will correspondingly move the front wheels E E and steer the entire machine.

W is a lever carried by the head of the gleaner, whereby the rake may be lifted from the ground. The platform Q may be provided with a catch $w$ to engage the lever W and lock the rake in a raised position.

X is a belt for operating the thrashing and separating machine from the driving-wheel B' of the engine.

The wheels D are driven from the shaft of the driving-wheel B' through suitable gearing. As it may be desirable to back the thrashing-machine, as for the purpose of gathering grain that may have been passed, and as this should be done without reversing the operation of the thrashing and separating apparatus, a reversing-clutch may be employed of any well-known construction.

Y is the rear platform for the engine-driver.

Z is a rake carried by the rear platform to collect the straw from the ground to supply fuel to the engine. This rake is preferably pivoted in a frame $z$ and may be operated by a lever Z' to lift it from the ground when it is not desired to use the straw for fuel.

The steering-wheel U is preferably arranged at the platform Y, so that it may be operated by the engine-driver, who thus has under his control the steering of the machine, the operation of the gleaner, and of the thrashing apparatus.

The operation of the machine is as follows: The engine drives the wheels D D in the manner heretofore described, and also operates the thrashing and separating machine through the belt X. As the machine moves over the field the grain is lifted therefrom by the gleaner. One or more men stationed upon the platform Q lift the grain to the thrashing-machine B, where it is thrashed and separated, the straw falling upon the ground, whence it may be taken up as fuel by the rake Z, and the separated grain rising through the elevator L to the trough I, whence it may be emptied as desired. The machine may be steered from side to side to gather the grain, and the gleaner may be simultaneously operated to pick up the shocks. By this means the grain of an entire field may be gleaned and thrashed with great facility and with the employment of few men.

In the modification shown in Fig. 6 I have shown an elevator-gleaner employed to lift the grain in the swath to the thrashing-machine. This elevator-gleaner is steered in a manner similar to the rake-gleaner shown in the other figures. In place of steam any other convenient motive power may be employed, and the power may be imparted directly to the wheels E E to drive the machine.

The minor details of construction have been shown for the purpose of more clearly showing my invention. These details may, however, be varied without departing from the invention, and therefore are not to be taken as limitations of it.

What I claim as new, and desire to secure by Letters Patent, is—

1. In a traveling thrashing-machine, the combination, with a wheeled frame or carriage having means to steer the front wheels thereof, of a thrashing-machine carried by said carriage, a movable gleaner also carried by said frame or carriage, so as to move therewith, and steering connections between the front wheels of the frame or carriage and the gleaner, whereby the gleaner is steered with said front wheels.

2. In a traveling thrashing-machine, the combination of a wheeled frame or carriage, a thrashing-machine carried thereby, means to steer the frame or carriage, a movable gleaner also carried by the frame or carriage, and steering connections between the gleaner and the means for steering the frame or carriage, whereby the gleaner is steered therewith.

3. In a thrashing-machine, the combination of a wheeled frame or carriage, an engine carried thereby and arranged to propel the carriage, a harvesting-machine carried by said frame or carriage, a gleaner pivotally connected with said frame adjacent to and in front of the carriage, steering devices to steer the gleaner while the carriage is traveling over the field, and connections between the steering devices and the front wheels of the carriage to steer the carriage simultaneously with the gleaner.

4. In a thrashing-machine, the combination of a wheeled carriage, an engine carried thereby and adapted to drive the carriage, and a harvesting-machine pivotally supported upon said carriage on a horizontal axis, whereby the harvesting-machine may be moved over the field, receiving and thrashing the grain while in motion.

5. A traction thrashing-machine for taking up, thrashing, and separating the cut grain as the machine moves over the field, consisting of a wheeled frame or carriage, a thrashing-machine carried thereby, a gleaner carried by said harvesting-machine and adapted to pick up the cut grain as the machine is moved over the field, an engine to drive said machine over the field, and means to steer the carriage and gleaner while the machine is in motion.

6. A traction thrashing-machine for taking up, thrashing, and separating the cut grain as the machine moves over the field, consisting of a wheeled frame or carriage, a thrashing-machine carried thereby, a gleaner also carried by said frame and arranged in front of the harvester, adapted to pick up the cut grain as the machine is moved over the field, an engine carried by said frame or carriage and driving it over the field, and interdependent means to steer the carriage and gleaner while the same are moving.

7. In a traveling thrashing-machine, the combination of a wheeled frame or carriage having its front axles movable upon vertical axes for the purpose of steering the frame or carriage, a gleaner carried by the frame or carriage, steering devices connected with said gleaner for operating the same, and a connection between said steering devices and the axles for moving the same upon their vertical axes simultaneously with the movement of the gleaner.

8. In a traveling thrashing-machine, the combination, with the axles of the front wheels of the wheeled frame or carriage, of the rods R R, movable upon vertical axes and carrying the axles of the front wheels, the arms R' R', the rods R R, a movable gleaner, and the steering-chain T T for operating the arms R' R', also connected with the gleaner.

In testimony of which invention I have hereunto set my hand.

EDWARD W. JENKINS.

Witnesses:
D. A. LINDSEY,
EDWD. A. RAUSON.